United States Patent [19]
Feyder

[11] Patent Number: 5,157,821
[45] Date of Patent: Oct. 27, 1992

[54] METHOD FOR EUMINATING A TEMPORARY DECREASE IN THE INSULATION RESISTANCE OF POLYESTER FILM CAPACITORS

[75] Inventor: Gusty Feyder, Dalheim, Luxembourg

[73] Assignee: E. I. Du Pont de Nemours and Company, Wilmington, Del.

[21] Appl. No.: 591,224

[22] Filed: Oct. 2, 1990

[51] Int. Cl.$^5$ .................. B29C 35/00; B29C 35/16
[52] U.S. Cl. ...................... 29/25.42; 156/DIG. 73; 264/346; 264/22; 264/347; 264/348; 264/235; 264/236; 264/237
[58] Field of Search ............... 264/104, 345, 235, 348, 264/235.8, 239, 346.22, 236, 347; 428/901; 156/309.9, DIG. 73; 29/825, 631.1, 592.1, 25.42, 25.03; 427/226

[56] References Cited

U.S. PATENT DOCUMENTS

| | | | |
|---|---|---|---|
| 3,348,971 | 10/1967 | Boykin | 427/226 |
| 3,452,133 | 6/1969 | Bratton et al. | 264/235 |
| 3,466,360 | 9/1969 | Chipman | 264/346 |
| 3,616,039 | 10/1971 | Hutzler | 156/309.9 |
| 3,767,500 | 10/1973 | Tally et al. | 264/345 |
| 3,769,132 | 10/1973 | Cram | 264/346 |
| 3,988,408 | 10/1976 | Haining et al. | 264/346 |
| 3,991,451 | 11/1976 | Maruyama et al. | 264/345 |
| 4,741,876 | 5/1988 | Rayburn | 264/348 |

Primary Examiner—Jan H. Silbaugh
Assistant Examiner—Mathieu Vargot

[57] ABSTRACT

An elevated temperature induced reduction of insulation resistance of a metal-polyethylene terephthalate film capacitor is eliminated by controlled cooling through a glass transition temperature of the polyethylene terephthalate film or by elevated temperature storing below the glass transition temperature.

10 Claims, 2 Drawing Sheets

METHOD FOR EUMINATING A TEMPORARY DECREASE IN THE INSULATION RESISTANCE OF POLYESTER FILM CAPACITORS

BACKGROUND OF THE INVENTION

The present invention is directed to elimination of a temporary decrease in insulation resistance of polyester film capacitors.

During manufacturing of metallized poly(ethylene terephthalate) (PET) film capacitors, the dielectric is exposed at several stages to thermal and mechanical stresses. Examples of such fabrication steps are found in wound and stacked capacitor processes and include film metallization, flattening, heat treatment and curing of the resin.

An annoying side effect of these processing steps is the impact they can have on a key electrical property of the capacitor, the insulation resistance (IR). The IR of a capacitor is a measure of the leakage current at specified electrical field strength, charging time, temperature and relative humidity. Typically the IR is measured at short charging times of one minute or less which, at ambient conditions, is well before a steady-state conduction regime with time-independent currents is reached. Constant and reproducible resistivity values ($10+^{18}$ ohm·cm) are reached for PET only after hours of continuous charging. IR is therefore not a measure of a fundamental material constant, but depends heavily on transient phenomena like dipolar relaxations or others. This transient nature makes the IR measurement inherently difficult.

Even if measurement conditions are carefully controlled, variations in the IR measurement by more than an order of magnitude are observed. They are attributed to manufacturing steps (a heat treatment for instance) in the capacitor process. Even though the IR normally recovers, it does so slowly and relaxation times are in excess of one week. This phenomenon can significantly influence IR quality control measurements. For instance, the nature of the heat treatment, the specific process and capacitor construction, the time elapsed between heat treatment and IR measurement all have their impact on the value recorded. Not only can these parameters be the cause for large variations in the IR measurement, they can also, in the right combination with other detrimental factors, cause the number of IR rejects to be unusually high.

Thus, a need is present for a technique to eliminate any decrease in insulation resistance in a capacitor.

SUMMARY OF THE INVENTION

The present invention is directed to a process to eliminate a reduction of insulation resistance obtained in manufacture of a capacitor containing alternating layers of a metal conductor separated by a polyester dielectric film comprising the steps of (a) forming a capacitor which is subjected during manufacture to an elevated temperature above the glass transition temperature of the polyester dielectric film and (b) cooling the polyester dielectric film from a temperature above the polyester glass transition temperature obtained in step (a) or in a subsequent heating step to a temperature below the polyester glass transition temperature at a rate not exceeding 1° C. per minute or maintaining the capacitor in a range from 40° C. to a temperature immediately below the glass transition temperature of the polyester dielectric film for at least 1 hour.

THE FIGURES

DETAILED DESCRIPTION OF THE INVENTION

Figure 1:
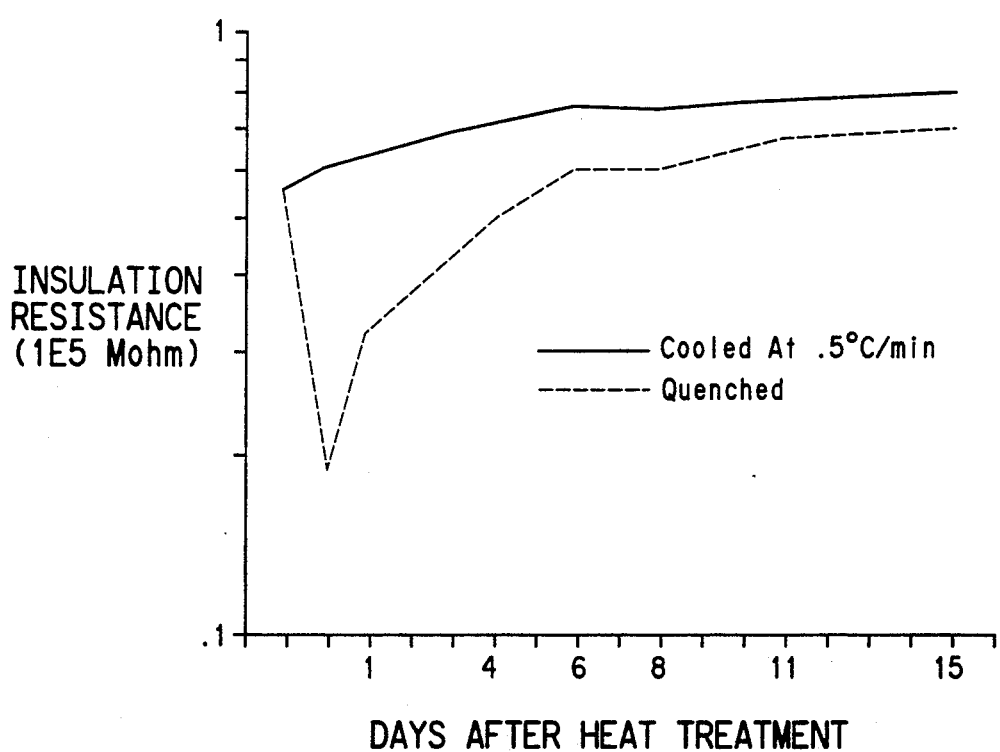
FIG. 1 represents data of Example 1 and graphs insulation resistance (IR) over a two week period for wound aluminum metallized 2.0 μm poly(ethylene terephthalate) film capacitors which have been heat treated and cooled to room temperature either at a rate of 0.5° C. per minute or by quenching.

In the manufacture of a capacitor, polyester film such as poly(ethylene terephthalate) (PET) is conventionally used as a dielectric in thicknesses which typically range from 1.0 μm to 20 μm. Such films are either conventionally metallized such as with aluminum or a separate metal foil is employed to obtain alternating layers of a dielectric and conductor. Illustrative capacitors include:

- wound and stacked radial components and surface-mountable chip devices, using metallized film (evaporated aluminum);
- wound film-foil components using plain film and aluminum foil electrodes.

In the manufacturing process of these capacitors, the polyester film is generally exposed to thermomechanical stresses in the form of either pressure or temperature or a combination of both. The aim of these treatments is to obtain a more stable and compact structure with improved temperature stability and effective dielectric constant.

An annoying side effect of these treatments is their impact on a key electrical property of the capacitor, namely insulation resistance (IR). The insulation resistance of a capacitor is a measure of the leakage currents in the component at a given electrical field and a fixed charging time (for example, 30 or 60 seconds). After a typical heat treatment, this quantity can be lower by more than an order of magnitude compared to the pretreatment level. Even though insulation resistance normally recovers, a relaxation time is typically long, generally in excess of one week. It is clear that this phenomenon gives a significant impact on quality control measurements. For instance, the nature of the heat treatment (time, temperature and pressure), the specific process and capacitor construction and the time elapsed during heat treatment and insulation resistance measurement are all parameters which have a direct impact on the value recorded. Not only can they be the cause for large variations observed in the insulation resistance measurement; they can in the right combination with other detrimental factors like humidity cause the number of insulation resistance rejects to increase dramatically.

The present invention is related to the recognition that the reduction phenomenon and its subsequent relaxation are strongly influenced and in fact completely determined by an additional parameter which has not been taken into account so far: the rate at which a capacitor is cooled to room temperature from the temperature at which it is heat treated. Typical heat treatment temperatures in formation of a capacitor are in the range 120°-220° C. which is in any case in excess of the dielectric's glass transition temperature (Tg) [around 80° C. for poly(ethylene terephthalate)]. The magnitude of the insulation resistance decrease is a direct function of the rate at which the dielectric component is cooled through its Tg.

In the present invention two processes have been found which are effective to eliminate a temporary decrease in insulation resistance. In a first method, the polyester film is cooled from above its glass transition temperature to below its glass transition temperature at a rate not exceeding 1° C. per minute and more preferably at a rate not exceeding from 0.5° C. to 0.8° C. per minute. Normal cooling or quenching in the prior art is at a considerably faster rate. In a second method, the polyester film which has been processed at a temperature above its glass transition temperature is subjected to elevated temperature in a range from 40° C. to below the glass transition temperature of the polyester film. Preferably the lower temperature in this range is 50° C. or 60° C. The duration of treatment is at least one hour and generally at least 3 hours. Most preferrably a time of at least 24 hours is employed.

Without being bound to any theory, an explanation for the phenomenon of the present invention is provided in terms of classical free-volume theory for physical aging in amorphous polymers. When a polymer is quenched at a high rate through its glass transition temperature, the polymer is not in thermodynamical equilibrium. Excessive amounts of free-volume are quenched into the amorphous parts of the polymer and this metastable state relaxes to equilibrium during what is commonly referred to as physical aging or free-volume relaxation. In contrast slow cooling through the glass transition temperature allows the polymer molecules to take a equilibrium state and no relaxation behavior is observed.

The effects of physical aging on the mechanical and thermal properties of amorphous and semicrystalline polymers [including poly(ethylene terephthalate)] are well documented in the literature. Their effect on certain electrical properties (thermally stimulated currents, charging currents) are also documented. It is not considered to have been recognized that they play an important role in determining macroscopic capacitor quality parameters like the insulation resistance of polyester film capacitors. Even though the insulation resistance reduction will recover with time it may, due to the long relaxation times, not have done so before the final quality control measurement in the process. This may lead to rejects for insulation resistance even though the insulation resistance can eventually recover above reject levels before the component goes into operation (ie, inserted into an electrical device).

Although the above discussion has been directed to poly(ethylene terephthalate) it is understood that other dielectric polyester films can be employed such as poly(ethylene napthalate).

To further illustrate the present invention the following examples are provided.

EXAMPLE 1

Capacitors were wound from aluminum metallized 2.0 μm poly(ethylene terephthalate) film, 4.5 mm wide with a margin of 0.25 mm. Components were wound to a capacitance of 500 nF. Insulation resistance was measured on wound cells and was found to be 50000 MOhm at a field strength of 40 V/μm and a charging time of 60 seconds. Cells were heat-treated for 3 hours at 150° C. Part of the cells were quenched to room temperature and part of the cells were slowly cooled to room temperature at a rate of 0.5° C./min. Initial insulation resistance was measured 1 hour after completion of the heat treatment and was then measured as a function of aging at 23° C. and 50% relative humidity over a two week period. Results are shown in FIG. 1 and they show that the metallized poly(ethylene terephthalate) film which was quenched to room temperature demonstrated a substantial reduction of insulation resistance. In contrast slow cooling of the metallized poly(ethylene terephthalate) film through the glass transition temperature substantially eliminated such reduction in insulation resistance.

EXAMPLES 2

Figure 2:
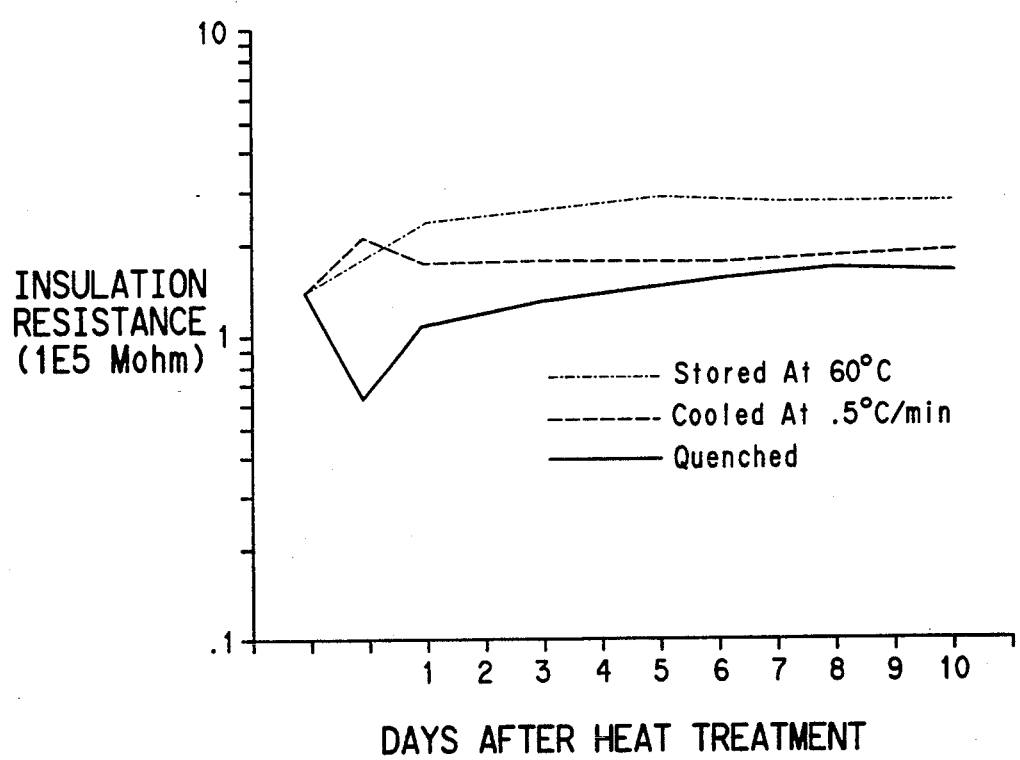
FIG. 2 represents data of Example 2 and graphs insulation resistance (IR) of wound aluminum metallized 5.0 μm poly(ethylene terephthalate) film capacitors in similar fashion as FIG. 1 except additional data is shown for capacitors which were stored at 60° C.

Capacitors were wound from aluminum metallized poly(ethylene terephthlate) 5.0 μm film, 9.0 mm wide with a margin of 1.0 mm. Components were wound to a capacitance of 250 nF. Insulation resistance of wound units was about 120000 MOhm at a field strength of 40 V/μm and a charging time of 60 seconds. Cells were treated for 3 hours at 150° C. The experiment described in Example 1 was repeated but in addition a portion of the cells were cooled at 0.5° C./min and were stored at 60° C. instead of room temperature. All results are shown in FIG. 2 and demonstrate that annealing at 60° C. increased the overall insulation resistance.

What is claimed is:

1. A method to eliminate a temporary reduction of insulation resistance obtained in a manufacture of a capacitor containing alternating layers of a metal conductor separated by a polyester dielectric film comprising the steps of
   (a) forming a capacitor which is subjected during manufacture to an elevated temperature above the glass transition temperature of the polyester dielectric film and
   (b) cooling the formed capacitor including the polyester dielectric film from said elevated temperature above the polyester glass transition temperature, said elevated temperature obtained in step (a) or in a subsequent heating step, to a temperature below the polyester glass transition temperature at a rate not exceeding 1° C. per minute or by storing the capacitor at a temperature in a range from 40° C. to immediately below the glass transition temperature of the polyester dielectric film for at least 1 hour.

2. The method of claim 1 wherein the polyester film is poly(ethylene terephthalate).

3. The method of claim 1 wherein the polyester film is poly(ethylene napthalate).

4. The method of claim 1 wherein the metal is aluminum.

5. The method of claim 4 wherein the elevated temperature is at least 120° C. for a time of at least one hour.

6. The method of claim 1 wherein the capacitor is inserted into an electrical device.

7. The method of claim 1 wherein in step (b) the cooling is at a rate not greater than 0.5° C. per minute.

8. The method of claim 1 wherein in step (b) the storing is for a time period of at least three hours.

9. The method of claim 8 wherein the storing is at a temperature above 50° C.

10. The method of claim 9 wherein the storing is for a time period of at least twenty-four hours.

* * * * *